(12) United States Patent
Hirota et al.

(10) Patent No.: US 12,354,812 B2
(45) Date of Patent: Jul. 8, 2025

(54) SOLID ELECTROLYTIC CAPACITOR ELEMENT AND SOLID ELECTROLYTIC CAPACITOR

(71) Applicant: Panasonic Intellectual Property Management Co., Ltd., Osaka (JP)

(72) Inventors: Kei Hirota, Okayama (JP); Takahiro Yoshii, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 90 days.

(21) Appl. No.: 18/258,296

(22) PCT Filed: Jan. 12, 2022

(86) PCT No.: PCT/JP2022/000738
§ 371 (c)(1),
(2) Date: Jun. 19, 2023

(87) PCT Pub. No.: WO2022/158350
PCT Pub. Date: Jul. 28, 2022

(65) Prior Publication Data
US 2024/0055191 A1  Feb. 15, 2024

(30) Foreign Application Priority Data
Jan. 22, 2021 (JP) .................. 2021-008911

(51) Int. Cl.
*H01G 9/028* (2006.01)
*H01G 9/15* (2006.01)
*H01G 9/00* (2006.01)

(52) U.S. Cl.
CPC ............. *H01G 9/028* (2013.01); *H01G 9/15* (2013.01); *H01G 9/0036* (2013.01)

(58) Field of Classification Search
None
See application file for complete search history.

(56) References Cited

U.S. PATENT DOCUMENTS

| | | | | |
|---|---|---|---|---|
| 5,005,107 A | * | 4/1991 | Kobashi | ............. H01G 9/15 361/540 |
| 6,906,912 B2 | * | 6/2005 | Arai | ............. H01G 9/0036 29/25.03 |

(Continued)

FOREIGN PATENT DOCUMENTS

| | | |
|---|---|---|
| JP | 2005-021410 | 1/2005 |
| JP | 2006-294843 | 10/2006 |

(Continued)

OTHER PUBLICATIONS

International Search Report of PCT application No. PCT/JP2022/000738 dated Mar. 22, 2022.

*Primary Examiner* — Dion R. Ferguson
(74) *Attorney, Agent, or Firm* — Rimon P.C.

(57) ABSTRACT

A solid electrolytic capacitor element includes an anode body, a dielectric layer formed on a surface of the anode body, and a cathode part covering at least a part of the dielectric layer. The cathode part includes a solid electrolyte layer covering the at least the part of the dielectric layer. The solid electrolyte layer includes a conductive polymer component containing a conjugated polymer. An oxygen permeability $P_1$ of the solid electrolyte layer after heating at 230° C. for 5 hours is less than or equal to 1.0 $cm^3/m^2 \cdot 24$ h·atm.

11 Claims, 1 Drawing Sheet

(56) References Cited

U.S. PATENT DOCUMENTS

| | | | |
|---|---|---|---|
| 10,340,091 B2* | 7/2019 | Bunha | C07C 309/28 |
| 12,087,514 B2* | 9/2024 | Hirota | H01G 9/15 |
| 2006/0268494 A1* | 11/2006 | Iida | H01G 9/0425 |
| | | | 361/532 |
| 2011/0051319 A1* | 3/2011 | Ishikawa | H01G 11/56 |
| | | | 427/79 |
| 2014/0063691 A1* | 3/2014 | Kosuge | H01G 9/028 |
| | | | 361/525 |
| 2020/0211785 A1* | 7/2020 | Tsubaki | H01G 9/035 |
| 2021/0198469 A1* | 7/2021 | Bunha | C08F 212/30 |
| 2022/0336160 A1* | 10/2022 | Saito | H01G 9/028 |
| 2023/0050288 A1* | 2/2023 | Tsubaki | H01G 9/0425 |
| 2023/0074619 A1* | 3/2023 | Hirota | H01G 9/048 |
| 2023/0245836 A1* | 8/2023 | Takeshita | H01G 9/028 |
| | | | 361/525 |
| 2023/0260716 A1* | 8/2023 | Tsubaki | H01G 9/035 |
| | | | 361/504 |
| 2023/0360859 A1* | 11/2023 | Yoshii | H01G 9/0036 |
| 2024/0055191 A1* | 2/2024 | Hirota | H01G 9/028 |

FOREIGN PATENT DOCUMENTS

| | | | | |
|---|---|---|---|---|
| JP | 2007-046033 | | 2/2007 | |
| JP | 2007-150252 | | 6/2007 | |
| JP | 2022099091 A | * | 7/2022 | |
| WO | WO-2022181607 A1 | * | 9/2022 | H01G 9/055 |

* cited by examiner

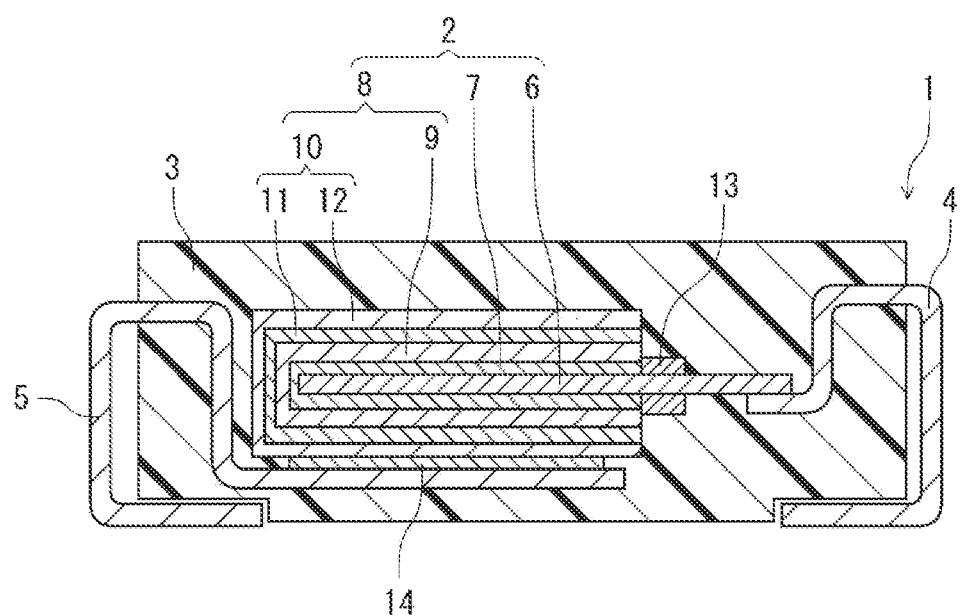

SOLID ELECTROLYTIC CAPACITOR ELEMENT AND SOLID ELECTROLYTIC CAPACITOR

CROSS-REFERENCE TO RELATED APPLICATIONS

This application is a U.S. national stage application of the PCT International Application No. PCT/JP2022/000738 filed on Jan. 12, 2022, which claims the benefit of foreign priority of Japanese patent application No. 2021-008911 filed on Jan. 22, 2021, the contents all of which are incorporated herein by reference.

TECHNICAL FIELD

The present disclosure relates to a solid electrolytic capacitor element and a solid electrolytic capacitor.

BACKGROUND

A solid electrolytic capacitor includes a solid electrolytic capacitor element, a resin exterior body or case that seals the solid electrolytic capacitor element, and an external electrode electrically connected with the solid electrolytic capacitor element. A solid electrolytic capacitor element includes an anode body, a dielectric layer formed on a surface of the anode body, and a cathode part that covers at least a part of the dielectric layer. The cathode part includes a solid electrolyte layer that covers the at least the part of the dielectric layer and contains a conductive polymer component.

Unexamined Japanese Patent Publication No. 2005-21410 proposes a solid electrolytic capacitor including at least an anode made of a valve metal, a dielectric film formed on the valve metal, and a solid electrolyte layer made of a conductive polymer formed on the dielectric film, wherein the conductive polymer is a complex of a conductive polymer with an ionic polymer. Unexamined Japanese Patent Publication No. 2005-21410 describes that a conductive polymer is formed by chemical polymerization or electrolytic polymerization.

SUMMARY

A solid electrolytic capacitor element according to a first aspect of the present disclosure includes: an anode body; a dielectric layer formed on a surface of the anode body; and a cathode part covering at least a part of the dielectric layer. The cathode part includes a solid electrolyte layer covering the at least the part of the dielectric layer. The solid electrolyte layer includes a conductive polymer component containing a conjugated polymer. An oxygen permeability $P_1$ of the solid electrolyte layer after heating at 230° C. for 5 hours is less than or equal to 1.0 $cm^3/m^2 \cdot 24$ h·atm.

A solid electrolytic capacitor according to a second aspect of the present disclosure includes the solid electrolytic capacitor element described above.

The present disclosure can provide a solid electrolytic capacitor element and a solid electrolytic capacitor excellent in heat resistance.

BRIEF DESCRIPTION OF THE DRAWINGS

FIG. 1 is a schematic sectional view illustrating a solid electrolytic capacitor according to one exemplary embodiment of the present disclosure.

DESCRIPTION OF EMBODIMENT

Prior to the description of an exemplary embodiment, problems in the conventional technology will be briefly described below.

When air enters an inside of a solid electrolytic capacitor, a conductive polymer component (conjugated polymer, dopant, etc.) is deteriorated by an action of moisture or oxygen contained in the air. When the conductive polymer component is deteriorated, the conductivity of the solid electrolyte layer is degraded. Further, the low orientation of the conjugated polymer in the solid electrolyte layer makes air more likely to enter when the solid electrolytic capacitor is exposed to a high temperature. For the reason, deterioration of the conductive polymer component is remarkable particularly in a high-temperature environment. The solid electrolytic capacitor may be used in a high-temperature environment depending on the application. Further, the solid electrolytic capacitor is generally soldered to a substrate through a reflow step that is exposed to a high temperature. Thus, there is a demand for a solid electrolytic capacitor element and a solid electrolytic capacitor that have excellent heat resistance.

In view of the problems mentioned above, the solid electrolytic capacitor element according to the first aspect of the present disclosure makes air (more specifically, oxygen) less likely to enter in the solid electrolyte layer in the case of exposure to a high temperature. More specifically, oxygen permeability $P_1$ of the solid electrolyte layer after heating at 230° C. for 5 hours is less than or equal to 1.0 $cm^3/m^2 \cdot 24$ h·atm. It is noted that 1 $cm^3/m^2 \cdot 24$ h·atm=9.87 $mL/m^2 \cdot day \cdot MPa$.

In the solid electrolytic capacitor element according to the first aspect, the conjugated polymer having high orientation is obtained in the solid electrolyte layer. The high orientation of the conjugated polymer improves the crystallinity of the conjugated polymer, and/or provides energetical stability of the conjugated polymer. Thus, a dense and rigid solid electrolyte layer that is excellent in film quality is obtained. As a result, the oxygen permeability of the solid electrolyte layer can be kept low, and the high conductivity of the solid electrolyte layer can be secured. Even in the case of being exposed to a high temperature, deterioration of the solid electrolyte layer is suppressed, and degradation of the capacitor performance (such as electrostatic capacity) can be suppressed. Accordingly, the high heat resistance of the solid electrolytic capacitor element and solid electrolytic capacitor can be secured. By obtaining excellent heat resistance, the reliability of the solid electrolytic capacitor element and the solid electrolytic capacitor can be enhanced.

Such a solid electrolyte layer can be formed by tripolar electrolytic polymerization. Conventionally, electrolytic polymerization is generally carried out in a bipolar manner using two electrodes of an anode and a counter electrode, wherein an anode body, which has a dielectric layer formed on the surface of the anode body, is used as the anode. In contrast, the tripolar electrolytic polymerization is carried out using three electrodes including an anode, a counter electrode, and a reference electrode wherein an anode body, which has a dielectric layer formed on the surface of the anode body, is used as the anode. During the tripolar electrolytic polymerization, by using the reference electrode, the potential of the anode can be precisely controlled without being affected by a change in the natural potential of the counter electrode. Thus, in the case of tripolar electrolytic polymerization, since the electrolytic polymerization reaction is controlled more precisely compared with the case of the bipolar electrolytic polymerization, the orientation of the conjugated polymer formed by electrolytic polymerization is enhanced. Hence, the crystallinity of the conjugated polymer is improved, and the energetical stability of the conjugated polymer is obtained. In both the bipolar electrolytic polymerization and the tripolar electrolytic polymerization, the solid electrolyte layer can be formed by electrolytic polymerization of the precursor of the conjugated polymer on the surface of the dielectric layer in the presence of a dopant as necessary.

For the solid electrolyte layer, the difference ($P_1-P_0$) between oxygen permeability $P_1$ and oxygen permeability $P_0$ before the heating is preferably less than or equal to 0.3 $cm^3/m^2 \cdot 24$ h·atm, and may be less than or equal to 0.25 $cm^3/m^2 \cdot 24$ h·atm. In this case, the heat resistance of the solid electrolytic capacitor element and solid electrolytic capacitor can be further enhanced. More specifically, even when the solid electrolytic capacitor element is exposed to a high temperature, the oxidation reaction is unlikely to proceed to suppress deterioration of the solid electrolyte layer and maintain high conductivity, thereby further suppressing degradation of the capacitor performance (such as electrostatic capacity).

The solid electrolytic capacitor element may be subjected to the heat treatment at a temperature in excess of 200° C. and lower than or equal to 300° C. When a conventional solid electrolytic capacitor element is subjected to the heat treatment at such a temperature, an oxidation reaction proceeds, and the oxygen permeability is higher than 1.0 $cm^3/m^2 \cdot 24$ h·atm, usually as high as 1.3 $cm^3/m^2 \cdot 24$ h·atm or more. In the solid electrolytic capacitor element according to the present disclosure, the solid electrolyte layer is excellent in film quality, and the oxygen permeability after the heat treatment at such a temperature as mentioned above can be kept low. Accordingly, the high heat resistance of the solid electrolytic capacitor element and solid electrolytic capacitor is obtained. The heat treatment may be performed, for example, for 1 hour or more.

In the present specification, the oxygen permeability of the solid electrolyte layer is an oxygen permeability ($cm^3/m^2 \cdot 24$ h·atm) that is measured in accordance with JIS K 7126-2:2006 with the use of a sample including a solid electrolyte layer of 4 μm in thickness. For the measurement of oxygen permeability $P_0$, a sample (sample A) is used for which a solid electrolyte layer of 4 μm in thickness is formed on one surface of a polyethylene terephthalate (PET) film (100 mm in length×100 mm in width×100 μm in thickness) under the same conditions as in the case of forming the solid electrolyte layer of the solid electrolytic capacitor element. In the formation of the solid electrolyte layer of the solid electrolytic capacitor element, in the case of forming a precoat layer, a precoat layer of 0.1 μm in thickness is formed before forming the solid electrolyte layer of the sample. Oxygen permeability $P_1$ is an oxygen permeability that is measured after sample A is heated at 230° C. for 5 hours. For example, the solid electrolyte layer of the sample to be subjected to the measurement of the oxygen permeability is formed so as to have the same degree of crystallinity as the crystallinity of the solid electrolyte layer of the solid electrolytic capacitor element. More specifically, the Raman spectrum of the solid electrolyte layer of the sample may substantially correspond to the Raman spectrum of the solid electrolyte layer of the solid electrolytic capacitor element. Specifically, the full width at half maximum of a peak (first peak) attributed to the C═C stretching vibration derived from the conjugated polymer in the Raman spectrum of the solid electrolyte layer of the sample may have a value within ±5% of the full width at half maximum of the first peak in the Raman spectrum of the solid electrolyte layer of the solid electrolytic capacitor element. Alternatively, the shift amount of the first peak in the Raman spectrum of the solid electrolyte layer of the sample from the reference position may have a value within ±5% of the shift amount of the first peak in the Raman spectrum of the solid electrolyte layer of the solid electrolytic capacitor element from the reference position. Note that the description of the Raman spectrum described later can be referenced regarding the Raman spectrum of the solid electrolyte layer, the reference position, and the shift amount of the first peak. The oxygen permeability is measured, for example, under the following conditions.

Apparatus: Oxygen permeability measurement apparatus OXTRAN 2/21 manufactured by MOCON, Inc.
Detector: Coulometric sensor
Measurement temperature: 23° C.
Relative humidity: 60% RH Hereinafter, the solid electrolytic capacitor and the solid electrolytic capacitor element (hereinafter, may be simply referred to as a capacitor element) of the present disclosure are described more specifically with reference to the drawings as necessary.

[Solid Electrolytic Capacitor]

A solid electrolytic capacitor includes one or more capacitor elements. At least one of the capacitor elements included in the solid electrolytic capacitor has only to include the solid electrolyte layer that exhibits such an oxygen permeability as mentioned above. It is preferable for 50% or more (more preferably 75% or more) of the number of the capacitor elements included in the solid electrolytic capacitor to include the solid electrolyte layer that exhibits such an oxygen permeability as mentioned above, and it is more preferable for all the capacitor elements to include the solid electrolyte layer that exhibits such an oxygen permeability as mentioned above.

(Capacitor Element)
(Anode Body)

The anode body may include a valve metal, an alloy containing the valve metal, a compound containing the valve metal, or the like. These materials can be used singly or in combination of two or more types thereof. As the valve metal, for example, aluminum, tantalum, niobium, and titanium are preferably used. The anode body having a porous surface is obtained by, for example, roughening a surface of a base material (such as a sheet-like (for example, a foil shape or a plate shape) base material) containing the valve metal by etching or the like. The roughening can be performed by, for example, an etching treatment or the like. Furthermore, the anode body may be a molded body of particles that contain the valve metal or a sintered body of the molded body. Note that each of the molded body and the sintered body has a porous structure. Each of the molded body and the sintered body may have a sheet shape, a rectangular parallelepiped shape, a cube shape, a shape similar thereto, or the like.

The anode body usually has an anode lead-out part and a cathode formation part. The cathode part is usually formed on the cathode formation part of the anode body with a dielectric layer interposed between the cathode part and the cathode formation part. An anode terminal is connected to the anode lead-out part.

(Dielectric Layer)

The dielectric layer is an insulating layer that functions as a dielectric material formed so as to cover a surface of at least a part of the anode body. The dielectric layer is formed by anodizing the valve metal of the surface of the anode body by an anodizing treatment or the like. It is sufficient that the dielectric layer is formed so as to cover at least a part of the anode body. Usually, the dielectric layer is formed on the surface of the anode body. Since the dielectric layer is formed on the porous surface of the anode body, the surface of the dielectric layer has a fine uneven shape as described above.

The dielectric layer contains an oxide of a valve metal. For example, when tantalum is used as the valve metal, the dielectric layer contains $Ta_2O_5$, and when aluminum is used as the valve metal, the dielectric layer contains $Al_2O_3$. Note that the dielectric layer is not limited thereto, and any dielectric layer may be used as long as the dielectric layer functions as a dielectric material.

(Cathode Part)

The cathode part includes a solid electrolyte layer covering at least a part of the dielectric layer. Furthermore, the cathode part may further include a cathode lead-out layer covering at least a part of the solid electrolyte layer. Usually, the cathode part is formed on at least a part of the surface of the anode body with the dielectric layer interposed between the cathode part and the surface of the anode body. Hereinafter, the solid electrolyte layer and the cathode lead-out layer are described.

(Solid Electrolyte Layer)

The solid electrolyte layer is formed on the surface of the anode body so as to cover the dielectric layer with the dielectric layer interposed therebetween. The solid electrolyte layer does not necessarily cover the entire dielectric layer (the entire surface of the dielectric layer), and it is sufficient that the solid electrolyte layer may be formed so as to cover at least a part of the dielectric layer. The solid electrolyte layer constitutes at least a part of the cathode part in the solid electrolytic capacitor.

The solid electrolyte layer generally contains a conductive polymer component. The conductive polymer component contains at least a conjugated polymer and may further contain a dopant as necessary.

(Conjugated Polymer)

As the conjugated polymer, known conjugated polymers for use in electrolytic capacitors can be used, such as a π-conjugated polymer. Examples of the conjugated polymer include polymers having polypyrrole, polythiophene, polyaniline, polyfuran, polyacetylene, polyphenylene, polyphenylene vinylene, polyacene, and polythiophene vinylene as a basic skeleton. The polymer may include at least one kind of monomer unit constituting the basic skeleton. The monomer unit also includes a monomer unit having a substituent. The polymer also includes a homopolymer and a copolymer of two or more monomers.

Among the conjugated polymers, conjugated polymers including a monomer unit corresponding to at least one selected from the group consisting of a pyrrole compound, a thiophene compound, and an aniline compound are preferred. Examples of the pyrrole compound include a compound having a pyrrole ring and capable of forming a repeated structure of a corresponding monomer unit. Examples of the thiophene compound include a compound having a thiophene ring and capable of forming a repeated structure of a corresponding monomer unit. These compounds can be linked at the 2-position and 5-position of the pyrrole ring or the thiophene ring to form the repeated structure of the monomer unit, thus can form a polymer with a π electron cloud spread throughout the molecule. Examples of the aniline compound include a compound having a benzene ring and at least one (preferably one) amino group bonded to the benzene ring and capable of forming a repeated structure of a corresponding monomer unit. The aniline compound can be linked to, for example, an amino group at a CH group (a CH group constituting a benzene ring) moiety at the p-position with respect to the amino group to form the repeated structure of the monomer unit, which can form a polymer that has a π electron cloud spread throughout the entire molecule.

The pyrrole compound may have, for example, a substituent at at least one of the 3- and 4-positions of the pyrrole ring. The thiophene compound may have a substituent at at least one of the 3- and 4-positions of the thiophene ring, for example. The substituent at the 3-position and the substituent at the 4-position may be linked to form a ring fused to a pyrrole ring or a thiophene ring. Examples of the pyrrole compound include pyrrole which may have a substituent at at least one of the 3- and 4-positions. Examples of the thiophene compound include thiophene which may have a substituent at at least one of the 3- and 4-positions and an alkylene dioxythiophene compound ($C_{2-4}$ alkylenedioxythiophene compounds such as ethylenedioxythiophene compounds, and the like). The alkylene dioxythiophene compound also includes those having a substituent in a part of an alkylene group. Examples of the aniline compound include an aniline optionally having a substituent at at least one of the o- and p-positions with respect to an amino group.

The substituent is preferably an alkyl group ($C_{1-4}$ alkyl groups such as methyl group and ethyl group, and the like), an alkoxy group ($C_{1-4}$ alkoxy groups such as methoxy group and ethoxy group, and the like), a hydroxy group, a hydroxyalkyl group (a hydroxy $C_{1-4}$ alkyl group such as a hydroxymethyl group, and the like), or the like, but is not limited thereto. When each of the pyrrole compound, thiophene compound, and aniline compound has two or more substituents, the respective substituents may be identical to or different from each other.

In particular, the use of a conjugated polymer including at least a monomer unit corresponding to pyrrole or a conjugated polymer (such as poly(3,4-ethylenedioxythiophene) (PEDOT)) including at least a monomer unit corresponding to a 3,4-ethylenedioxythiophene compound (such as 3,4-ethylenedioxythiophene (EDOT)) can further enhance the film quality of the solid electrolyte layer. Accordingly, the effect of reducing the oxygen permeability of the solid electrolyte layer is enhanced. In addition to easily obtaining the high heat resistance, the further increased conductivity of the solid electrolyte layer is easily secured. The conjugated polymer including at least a monomer unit corresponding to pyrrole may include only a monomer unit corresponding to pyrrole, or may include a monomer unit corresponding to a pyrrole compound other than pyrrole (pyrrole having a substituent, etc.) in addition to the monomer unit. The conjugated polymer including at least a monomer unit corresponding to EDOT may include only a monomer unit corresponding to EDOT, or may include a monomer unit corresponding to a thiophene compound other than EDOT in addition to the monomer unit.

In the conjugated polymer including a monomer unit corresponding to a pyrrole compound, the molar ratio of the monomer unit corresponding to the pyrrole compound (or pyrrole) is preferably 50 mol % or more, more preferably 75 mol % or more, from the viewpoint of easily ensuring higher electrostatic capacity. The molar ratio of the monomer unit corresponding to the pyrrole compound (or pyrrole) in the conjugated polymer is less than or equal to 100 mol %. The conjugated polymer may be composed of only a repeated structure of the monomer unit corresponding to the pyrrole compound (or pyrrole).

In the conjugated polymer including the monomer unit corresponding to the thiophene compound, the molar ratio of the monomer unit corresponding to the thiophene compound (or EDOT) is preferably 50 mol % or more, more preferably 75 mol % or more, from the viewpoint of easily ensuring higher electrostatic capacity. The molar ratio of the monomer unit corresponding to the thiophene compound (or EDOT) in the conjugated polymer is less than or equal to 100 mol %. The conjugated polymer may be composed of only a repeated structure of the monomer unit corresponding to the thiophene compound (or EDOT).

As the conjugated polymer, one kind may be used alone, or two or more kinds may be used in combination.

The weight-average molecular weight (Mw) of the conjugated polymer is not particularly limited, and ranges, for example, from 1,000 to 1,000,000, inclusive.

(Dopant)

As the dopant, at least one selected from the group consisting of anions and polyanions is used, for example.

Examples of the anion include, but are not particularly limited to, a sulfate ion, a nitrate ion, a phosphate ion, a borate ion, an organic sulfonate ion, and a carboxylate ion. Examples of the dopant that generates sulfonate ions include p-toluenesulfonic acid and naphthalenesulfonic acid.

Examples of the polyanion include a polymer anion. The solid electrolyte layer may contain, for example, a conjugated polymer including a monomer unit corresponding to a thiophene compound and a polymer anion. In the case where the solid electrolytic capacitor contains a polymer anion, even when the solid electrolytic capacitor element is exposed to a high temperature, dedoping hardly occurs, and thus higher heat resistance is obtained.

Examples of the polymer anion include polymers having a plurality of anionic groups. Examples of such a polymer include a polymer including a monomer unit having an anionic group. Examples of the anionic group include a sulfonic acid group and a carboxy group.

In the solid electrolyte layer, the anionic group of the dopant may be contained in a free form, an anion form, or a salt form, or may be contained in a form bonded or interacting with the conjugated polymer. In the present description, all of these forms may be simply referred to as an "anionic group", a "sulfonic acid group", or a "carboxy group", etc.

Examples of the polymer anion having a carboxy group include, but are not limited to, a copolymer using at least one of polyacrylic acid, polymethacrylic acid, acrylic acid, and methacrylic acid.

Specific examples of the polymer anion having a sulfonic acid group, for example, polymer type polysulfonic acids, include, but are not limited to, polyvinylsulfonic acid, polystyrenesulfonic acid (including copolymers and substituted products with substituents, etc.), polyallylsulfonic acid, polyacrylsulfonic acid, polymethacrylsulfonic acid, poly(2-acrylamide-2-methylpropanesulfonic acid), polyisoprenesulfonic acid, polyestersulfonic acid (aromatic polyester sulfonic acid, etc.), and phenolsulfonic acid novolac resin.

The amount of the dopant contained in the solid electrolyte layer ranges, for example, from 10 parts by mass to 1000 parts by mass, inclusive, and may range from 20 parts by mass to 500 parts by mass, inclusive or from 50 parts by mass to 200 parts by mass, inclusive with respect to 100 parts by mass of the conjugated polymer.

(Oxygen Permeability)

Oxygen permeability $P_1$ of the solid electrolyte layer obtained when the layer is heated at 230° C. for 5 hours is less than or equal to 1.0 $cm^3/m^2 \cdot 24$ h·atm, preferably less than or equal to 0.9 $cm^3/m^2 \cdot 24$ h·atm, and may be less than or equal to 0.8 $cm^3/m^2 \cdot 24$ h·atm or less than or equal to 0.7 $cm^3/m^2 \cdot 24$ h·atm. In the solid electrolyte layer that exhibits such oxygen permeability $P_1$, the conjugated polymer is high in orientation, with the conjugated polymer in an energetically stabilized state. Further, such a solid electrolyte layer is dense in film quality with high conductivity. Thus, the solid electrolytic capacitor element and the solid electrolytic capacitor suppress, when the element and the capacitor are exposed to a high temperature, deterioration of the solid electrolyte layer, and suppress degradation of the capacitor performance such as electrostatic capacity. Accordingly, high heat resistance is obtained. Oxygen permeability $P_1$ of the solid electrolyte layer is, for example, 0.01 $cm^3/m^2 \cdot 24$ h·atm or more.

For example, oxygen permeability $P_1$ of the solid electrolyte layer containing polypyrrole and a dopant (a naphthalenesulfonic acid or the like), formed by the bipolar electrolytic polymerization is higher than 1.0 $cm^3/m^2 \cdot 24$ h·atm, and usually 1.3 $cm^3/m^2 \cdot 24$ h·atm or more. Further, oxygen permeability $P_1$ of the solid electrolyte layer formed with the use of a liquid dispersion containing polypyrrole and a dopant (such as a polystyrene sulfonic acid) is usually 1.3 $cm^3/m^2 \cdot 24$ h·atm or more. Oxygen permeability $P_1$ of the solid electrolyte layer formed by chemical polymerization with the use of a polymerization liquid containing pyrrole and a dopant (such as a naphthalenesulfonic acid) is usually 1.5 $cm^3/m^2 \cdot 24$ h·atm or more.

Oxygen permeability $P_1$ of the solid electrolyte layer containing PEDOT and a dopant (a polystyrene sulfonic acid or the like), formed by the bipolar electrolytic polymerization is higher than 1.0 $cm^3/m^2 \cdot 24$ h·atm, and usually 1.3 $cm^3/m^2 \cdot 24$ h·atm or more. Further, oxygen permeability $P_1$ of the solid electrolyte layer formed with the use of a liquid dispersion containing PEDOT and a dopant (such as a polystyrene sulfonic acid) is usually 1.3 $cm^3/m^2 \cdot 24$ h·atm or more. Oxygen permeability $P_1$ of the solid electrolyte layer formed by chemical polymerization with the use of a polymerization liquid containing EDOT and a dopant (such as a polystyrene sulfonic acid) is usually 1.5 $cm^3/m^2 \cdot 24$ h·atm or more.

In the solid electrolytic capacitor element according to the first aspect, the solid electrolyte layer is excellent in film quality, and the oxygen permeability of the solid electrolyte layer can be kept low even when the solid electrolyte layer is exposed to a high temperature. For the solid electrolyte layer, the difference $(P_1-P_0)$ between oxygen permeability $P_1$ after the heating at 230° C. for 5 hours and oxygen permeability $P_0$ before the heating is, for example, less than or equal to 0.3 $cm^3/m^2 \cdot 24$ h·atm, and may be less than or equal to 0.25 $cm^3/m^2 \cdot 24$ h·atm. Further, in the conventional solid electrolytic capacitor element, the solid electrolyte layer is poor in film quality and high in oxygen permeability $P_1$, and the value of $(P_1-P_0)$ has a large value that excesses 0.5 $cm^3/m^2 \cdot 24$ h·atm.

The solid electrolytic capacitor element may be subjected to the heat treatment at a high temperature in excess of 200° C., for example. The temperature of the heat treatment is, for example, higher than 200° C. and lower than or equal to 300° C., and may be from 210° C. to 300° C., inclusive, or from 210° C. to 250° C., inclusive. In a conventional solid electrolytic capacitor element, the solid electrolyte layer is poor in film quality, and thus, when the conventional solid capacitor element is subjected to the heat treatment at such a high temperature, the solid electrolyte layer undergoes, due to deterioration of the conductive polymer component, an increase in oxygen permeability and a decrease in conductivity. Thus, the capacitor performance such as electrostatic capacity is degraded. The solid electrolytic capacitor element according to the first aspect, however, maintains the excellent film quality of the solid electrolyte layer, and allows high capacitor performance to be secured, even when the element is subjected to the heat treatment at a high temperature.

A time for the heat treatment is, for example, 1 hour or more, may be 2 hours or more, or 3 hours or more. The time for the heat treatment time is, for example, less than or equal to 10 hours, and may be less than or equal to 6 hours or less than or equal to 5 hours. The lower and upper limit values can be arbitrarily combined.

The heat treatment may be performed in the air or under an inert gas atmosphere. The atmosphere for the heat treatment can be selected, depending on the stage of performing the heat treatment. For example, when heat treatment is performed after the formation of the cathode lead-out layer, the heat treatment may be performed in the air.

(Raman Spectrum)

In the solid electrolytic capacitor element and solid electrolytic capacitor according to the present disclosure, the solid electrolyte layer exhibits high crystallinity due to the high orientation of the conjugated polymer. Further, the conjugated polymer is in an energetically stabilized state in the solid electrolyte layer. Thus, the solid electrolyte layer exhibits a characteristic Raman spectrum. Hereinafter, the Raman spectrum of the solid electrolyte layer will be described more specifically.

The main component of the solid electrolyte layer is the conjugated polymer, and in the Raman spectrum of the solid electrolyte layer, the peak (first peak) attributed to the C=C stretching vibration derived from the conjugated polymer is the highest, and the height is characteristic. In the solid electrolyte layer, when the orientation of the conjugated polymer increases or the energy state changes, the vibration state of the C=C bond changes, and thus, at least one of the full width at half maximum of the first peak attributed to the C=C stretching vibration and the position of the peak changes. Thus, the orientation state or the energy state of the conjugated polymer in the solid electrolyte layer can be grasped on the basis of at least one of the full width at half maximum and the peak position of the first peak attributed to the C=C stretching vibration.

Preferred is a case in which the full width at half maximum of the first peak is less than or equal to 80 $cm^{-1}$ when the first peak is fitted with a Lorentz function in the Raman spectrum of the solid electrolyte layer. In this case, in the solid electrolyte layer, the orientation of the conjugated polymer is further enhanced, and the film quality can be improved. Accordingly, the oxygen permeability of the solid electrolyte layer can be kept low, and the high conductivity can be secured. Further, even when the solid electrolytic capacitor element is exposed to a high temperature, the oxidation reaction is unlikely to proceed to suppress deterioration of the solid electrolyte layer, and then maintain high conductivity, thereby suppressing degradation of the capacitor performance such as electrostatic capacity. The high heat resistance of the solid electrolytic capacitor element and solid electrolytic capacitor is obtained, thereby allowing the reliability to be enhanced. The full width at half maximum of the first peak is, for example, 35 $cm^{-1}$ or more. In this case, the solid electrolyte layer can be easily formed.

From the viewpoint of obtaining the increased orientation of the conjugated polymer, the full width at half maximum of the first peak may be 50 $cm^{-1}$ or more, 55 $cm^{-1}$ or more, or 58 $cm^{-1}$ or more. When the full width at half maximum of the first peak falls within the range mentioned above, oxygen permeability $P_1$ of the solid electrolyte layer can be estimated to be less than or equal to 1.0 $cm^3/m^2 \cdot 24$ h·atm.

In the Raman spectrum of the solid electrolyte layer, a case is also preferred in which the position of the first peak is shifted to the lower wavenumber side from the reference position in the case where the solid electrolyte layer is formed by the bipolar electrolytic polymerization and heated at 230° C. for 5 hours. In this case, in the solid electrolyte layer, the orientation of the conjugated polymer is enhanced with the conjugated polymer in an energetically stabilized state. Thus, the oxygen permeability of the solid electrolyte layer can be kept low, and the high conductivity of the solid electrolyte layer can be easily secured. Further, even when the solid electrolytic capacitor element is exposed to a high temperature, the improved film quality of the solid electrolyte layer makes the oxidation reaction unlikely to proceed to maintain high conductivity, thereby suppressing degradation of the capacitor performance such as electrostatic capacity. Further, the conjugated polymer is easily appropriately doped with the dopant to make conjugated polymer less likely to be in a reduced state, and thus, the progress of the oxidation reaction is also prevented. The high heat resistance of the solid electrolytic capacitor element and solid electrolytic capacitor is obtained, thereby allowing the reliability to be enhanced. Note that the reference position is a position of a second peak when the peak (second peak) attributed to the C=C stretching vibration derived from the conjugated polymer is fitted with the Lorentz function in the Raman spectrum of the solid electrolyte layer containing the conjugated polymer formed by bipolar electrolytic polymerization and heated at 230° C. for 5 hours.

The shift amount of the first peak position from the reference position is usually 0.2% or more, preferably from 0.25% to 0.3%, inclusive. When the shift amount is in such a range, the conjugated polymer is in an energetically stable state in the solid electrolyte layer, and thus the oxidation reaction is less likely to proceed. For example, since the conjugated polymer is more likely to be appropriately doped with the dopant, the conjugated polymer is less likely to be in a reduced state. Accordingly, high heat resistance is obtained. The shift amount is usually less than or equal to 1%, and may be less than or equal to 0.7% or less than or equal to 0.51%. When the shift amount is in such a range, the conjugated polymer is more likely to be appropriately doped with the dopant, and thus, an excessive increase in the decomposition of the dopant contained in the solid electrolyte layer is suppressed. Accordingly, high heat resistance is obtained. The lower and upper limit values of the shift amount can be arbitrarily combined. Note that when the shift amount of the first peak falls within the range mentioned above, oxygen permeability $P_1$ can be estimated to be less than or equal to 1.0 $cm^3/m^2 \cdot 24$ h·atm. The shift amount is the ratio (%) of an actual shift amount ($cm^{-1}$) of the first peak from the reference position when the wavenumber ($cm^{-1}$) at the reference position is set to 100%.

For example, when the conjugated polymer includes at least a monomer unit corresponding to pyrrole, the position of the first peak is preferably from 1566 $cm^{-1}$ to 1578 $cm^{-1}$, inclusive, more preferably from 1570 $cm^{-1}$ to 1577 $cm^{-1}$. When the conjugated polymer includes at least a monomer unit corresponding to EDOT, the position of the first peak is preferably from 1423 $cm^{-1}$ to 1435 $cm^{-1}$, inclusive, more preferably from 1429 cm$^{-1}$ to 1434 cm$^{-1}$, inclusive. In these cases, higher heat resistance of the solid electrolytic capacitor element can be ensured.

Note that the solid electrolytic capacitor for determining the reference position is formed under the same conditions as in the case of forming the solid electrolytic capacitor by utilizing the comparative tripolar electrolytic polymerization, except that the solid electrolyte layer is formed by the bipolar electrolytic polymerization and heated at 230° C. for 5 hours. The bipolar electrolytic polymerization is performed by immersing a cathode forming portion of an anode body with a dielectric layer formed on the surface thereof and a titanium (Ti) electrode as a counter electrode in a liquid composition including a precursor for a conjugated polymer and a dopant as necessary, and applying a voltage to the anode body in a manner that the anode body has a potential of 3.0 V with respect to a silver/silver chloride reference electrode. The pH of the liquid composition is, for example, 3.0. The same components as those in the case of forming the solid electrolytic capacitor by utilizing the comparative tripolar electrolytic polymerization are used for the precursor and dopant of the conjugated polymer. The heating at 230° C. is performed in the air after the formation of the cathode lead-out layer.

In the solid electrolytic capacitor element, the full width at half maximum of the first peak may fall within the range as mentioned above (condition a), or the shift amount of the position of the first peak may fall within the range as mentioned above (condition b). Alternatively, the solid electrolytic capacitor element may satisfy the both of condition a and condition b.

In the present description, the Raman spectrum of the solid electrolyte layer of the solid electrolytic capacitor element is measured under the following conditions with respect to a cross section of the solid electrolyte layer at a predetermined position of the solid electrolytic capacitor element. The Raman spectrum of the solid electrolyte layer of sample A is measured under the following conditions with respect to a cross section of the solid electrolyte layer parallel to the thickness direction at an arbitrary position of sample A.

Raman spectrometer: RamanFORCE PAV manufactured by NanoPhoton Corporation

Diffraction grating: 600 gr/cm

Measurement wavenumber range: from 0 cm$^{-1}$ to 2500 cm$^{-1}$, inclusive

Temperature: 25° C.

The irradiation laser light wavelength, the laser power density, and the exposure time are determined depending on the type of the conjugated polymer. For example, when the conjugated polymer is polypyrrole, the irradiation laser light wavelength is 532 nm, the laser power density is 140 W/cm$^2$, and the exposure time is 75 seconds. When the conjugated polymer is poly (3,4-ethylenedioxythiophene) (PEDOT), the irradiation laser light wavelength is 785 nm, the laser power density is 660 W/cm$^2$, and the exposure time is 60 seconds.

For the measurement of the Raman spectrum of the solid electrolyte layer of the solid electrolytic capacitor element, a sample (sample B) collected by the following procedure can be used. First, the solid electrolytic capacitor is embedded in a curable resin to cure the curable resin. By applying polishing treatment or cross section polishing working to the cured product, a cross section of the cured product parallel to the thickness direction of the solid electrolyte layer and perpendicular to the length direction of the capacitor element is exposed. When the length of the solid electrolyte layer in a direction parallel to the length direction of the capacitor element is 1, the cross section is at a position of 0 to 0.05 from the end of the solid electrolyte layer on the side opposite to the anode lead-out part. In this way, a sample for measurement (sample B) is obtained. In the cross section of the exposed solid electrolyte layer of sample B, the Raman spectrum is measured for a region of 8 μm×8 μm of a portion (surface layer portion) from the surface to the depth 100 nm of the solid electrolyte layer and a portion formed in the holes and recesses (sometimes referred to as pits) of the surface of the anode body of the solid electrolyte layer. The full width at half maximum and the peak position of the peak attributed to the C=C stretching vibration are obtained by averaging the measured values for 6 regions of 8 μm×8 μm of the surface layer portion and 12 regions of 8 μm×8 μm of the portion formed in the pit of the solid electrolyte layer. The cross-section of sample A can be exposed in the same manner as in the case of exposing the cross-section of sample B.

The anode body usually has an anode lead-out part including a first end and a cathode formation part including a second end. A direction directed from the side of the first end toward the side of the second end of the anode body is referred to as the length direction of the anode body or the capacitor element. The length of the solid electrolyte layer is the length in a direction parallel to the length direction of the capacitor element. The direction directed from the side of the first end toward the side of the second end of the anode body is parallel to a straight line direction that connects a center of an end surface of the first end and a center of an end surface of the second end to each other.

(Others)

The solid electrolyte layer may further contain at least one selected from a group consisting of a known additive agent and a known conductive material other than the conductive polymer component as necessary. Examples of conductive material include at least one selected from the group consisting of conductive inorganic materials such as manganese dioxide and TCNQ complex salts.

The solid electrolyte layer may be a single layer or may be formed of a plurality of layers. For example, the solid electrolyte layer may include a first solid electrolyte layer covering at least a part of the dielectric layer and a second solid electrolyte layer covering at least a part of the first solid electrolyte layer. The type, composition, content, and the like of the conductive polymer component, the additive agent, and the like contained in each layer may be different or the same in each layer.

(Method of Forming Solid Electrolyte Layer)

The solid electrolyte layer can be formed by electrolytically polymerizing a precursor of the conjugated polymer in a tripolar manner in the presence of the dopant as necessary on the surface of the dielectric layer. For example, electrolytic polymerization is performed in a state where a cathode formation part of an anode body having a dielectric layer formed on a surface thereof is immersed in a liquid composition containing the precursor of the conjugated polymer and the dopant as necessary. By performing such electrolytic polymerization, the orientation of the conjugated polymer can be enhanced. Further, the conjugated polymer can be energetically stabilized by being appropriately doped with a dopant. Thus, high heat resistance of the capacitor element can be ensured.

Examples of the precursor of the conjugated polymer include a raw material monomer of the conjugated polymer, an oligomer and a prepolymer in which a plurality of molecular chains of the raw material monomer are linked, and the like. One kind of precursor may be used, or two or more kinds of precursor may be used in combination. From the viewpoint of easily obtaining higher orientation of the conjugated polymer, it is preferable to use at least one kind selected from a group consisting of monomers and oligomers (particularly, monomers) as the precursor.

The liquid composition usually contains a solvent. Examples of the solvent include water, an organic solvent, and a mixed solvent of water and an organic solvent (such as a water-soluble organic solvent).

When a dopant, another conductive material, an additive agent, and the like are used, they may be added to the liquid composition.

The liquid composition may contain an oxidizing agent as necessary. Furthermore, the oxidizing agent may be applied to the anode body before or after the liquid composition is brought into contact with the anode body on which the dielectric layer is formed. Examples of such an oxidizing agent include a compound capable of generating $Fe^{3+}$ (such as a ferric sulfate), a persulfate (such as a sodium persulfate or an ammonium persulfate), and a hydrogen peroxide. The oxidizing agent may be used singly or in combination of two or more types thereof.

The pH of the liquid composition is, for example, from 0.5 to 2.5, inclusive, preferably from 0.5 to 2, inclusive, or from 1 to 2, inclusive, and may be from 1.3 to 1.7, inclusive. When the pH of the liquid composition is in such a range, generation of oxygen during electrolytic polymerization can be suppressed, and a solid electrolyte layer having excellent film quality can be easily obtained. The pH of the liquid composition can be adjusted by, for example, adjusting the content of the dopant, the content of the oxidizing agent, or the like in the liquid composition.

Tripolar electrolytic polymerization is performed in a state in which the anode body, the counter electrode, and the reference electrode are immersed in the liquid composition. As the counter electrode, for example, a Ti electrode is used, but the counter electrode is not limited thereto. As the reference electrode, it is preferable to use a silver/silver chloride electrode ($Ag/Ag^+$).

In the electrolytic polymerization, the voltage (polymerization voltage) applied to the anode body ranges, for example, from 0.6 V to 1.5 V, inclusive, and may range from 0.7 V to 1 V, inclusive, from 0.7 V to 0.9 V inclusive, from 0.7 V to 0.85 V, inclusive, or from 0.7 V to 0.8 V, inclusive. By performing the tripolar electrolytic polymerization, the electrolytic polymerization can be performed at such a relatively low polymerization voltage, and the polymerization reaction can be precisely controlled. Thus, the orientation of the conjugated polymer can be further enhanced. Further, a dopant can be appropriately doped. Note that the polymerization voltage is a potential of the anode body with respect to a reference electrode (silver/silver chloride electrode ($Ag/Ag^+$)). During the electrolytic polymerization, a power feeder (such as a power feeding tape) is electrically connected to the anode lead-out part, and a voltage is applied to the anode body via the power feeder. The potential of the anode body is a potential of the power feeder electrically connected to the anode body.

The temperature at which the electrolytic polymerization is performed ranges, for example, from 5° C. to 60° C., inclusive, and may range from 15° C. to 35° C., inclusive.

A precoat layer may be formed on the surface of the dielectric layer prior to electrolytic polymerization. The precoat layer contains, for example, a conductive material. The precoat layer may be formed with the use of a liquid dispersion containing a conjugated polymer and a dopant.

The conjugated polymer of the precoat layer and the conjugated polymer formed by the electrolytic polymerization may be the same or different in type. The dopant of the precoat layer and the dopant for use in the electrolytic polymerization may be the same or different.

(Cathode Lead-Out Layer)

The cathode lead-out layer only has to include at least a first layer that is in contact with the solid electrolyte layer and covers at least part of the solid electrolyte layer, and may include a first layer and a second layer covering the first layer. Examples of the first layer include: a layer containing conductive particles; and a metal foil. Examples of the conductive particles include at least one selected from conductive carbon and metal powder. For example, the cathode lead-out layer may be formed of a layer containing conductive carbon (also referred to as a carbon layer) as the first layer and a layer containing metal powder or a metal foil as the second layer. In a case where a metal foil is used as the first layer, this metal foil may constitute the cathode lead-out layer.

Examples of the conductive carbon include graphite (artificial graphite, natural graphite, and the like).

The layer containing metal powder as the second layer can be formed, for example, by stacking a composition containing metal powder on a surface of the first layer. Examples of such a second layer include a metal paste layer formed using a composition containing metal powder such as silver particles and a resin (binder resin). As the resin, although a thermoplastic resin can be used, a thermosetting resin such as an imide resin or an epoxy resin is preferably used.

In the case of using a metal foil as the first layer, the type of metal constituting the metal foil is not particularly limited. A valve metal (aluminum, tantalum, or niobium), or an alloy containing a valve metal is preferably used for the metal foil. As necessary, the surface of the metal foil may be roughened. On the surface of the metal foil, there may be provided an anodization film, and there may be provided a film of a metal (different type of metal) different from the metal constituting the metal foil, or a non-metal film. Examples of the different type of metal and nonmetal include metals such as titanium and nonmetals such as carbon (conductive carbon or the like).

A coating film of the different type of metal or nonmetal (for example, conductive carbon) may be used as the first layer, and the metal foil may be used as the second layer.

(Separator)

When the metal foil is used for the cathode lead-out layer, a separator may be disposed between the metal foil and the anode foil. The separator is not particularly limited. For example, it is possible to use an unwoven fabric including fibers of cellulose, polyethylene terephthalate, vinylon, or polyamide (for example, aliphatic polyamide or aromatic polyamide such as aramid).

(Others)

The solid electrolytic capacitor may be a wound type, or may be either a chip type or a stacked type. For example, the solid electrolytic capacitor may include a stack body of two or more capacitor elements. The configuration of the capacitor element may be selected in accordance with the type of the solid electrolytic capacitor.

In the capacitor element, one end of the cathode terminal is electrically connected to the cathode lead-out layer. For example, a conductive adhesive is applied to the cathode lead-out layer, and the cathode terminal is bonded to the cathode lead-out layer via the conductive adhesive. One end of an anode terminal is electrically connected to the anode body. The other end of the anode terminal and the other end of the cathode terminal are respectively drawn out from a resin exterior body or a case. The other end of each terminal exposed from the resin exterior body or the case is used for, for example, solder connection to a substrate on which the solid electrolytic capacitor is to be mounted.

The capacitor element is sealed using the resin exterior body or the case. For example, a material resin (for example, uncured thermosetting resins and fillers) of the capacitor element and the exterior body may be housed in a mold, and the capacitor element may be sealed with the resin exterior body by a transfer molding method, a compression molding method, or the like. At this time, a part on the other end side of each of the anode terminal and the cathode terminal connected to the anode lead drawn out from the capacitor element is exposed from the mold. Further, the solid electrolytic capacitor may be formed by housing the capacitor element in a bottomed case such that a part on the other end side of each of the anode terminal and the cathode terminal is positioned on an opening side of the bottomed case, and sealing the opening of the bottomed case with a sealing body.

When the solid electrolytic capacitor element is subjected to the heat treatment at a temperature in excess of 200° C. as described above, the heat treatment can be performed at an appropriate stage after the formation of the solid electrolyte layer. For example, the heat treatment may be performed after the formation of the solid electrolyte layer and before the formation of the cathode lead-out layer, may be performed after the formation of the cathode lead-out layer and before the sealing with the use of the resin exterior body or the case, or may be performed after the sealing.

FIG. 1 is a cross-sectional view schematically illustrating a structure of a solid electrolytic capacitor according to a first exemplary embodiment of the present disclosure. As illustrated in FIG. 1, solid electrolytic capacitor 1 includes capacitor element 2, resin exterior body 3 that seals capacitor element 2, and anode terminal 4 and cathode terminal 5 that are each at least partially exposed to an outside of resin exterior body 3. Anode terminal 4 and cathode terminal 5 can be made of metal such as copper or a copper alloy. Resin exterior body 3 has a substantially rectangular parallelepiped outer shape, and solid electrolytic capacitor 1 also has a substantially rectangular parallelepiped outer shape.

Capacitor element 2 includes anode body 6, dielectric layer 7 covering anode body 6, and cathode part 8 covering dielectric layer 7. Cathode part 8 includes solid electrolyte layer 9 covering dielectric layer 7, and cathode lead-out layer 10 covering solid electrolyte layer 9. In the illustrated example, solid electrolyte layer 9 includes a conductive polymer component containing a conjugated polymer.

Anode body 6 includes a region facing cathode part 8 and a region not facing cathode part 8. In the region of anode body 6 that does not face cathode part 8, insulating separation part 13 is formed in a part adjacent to cathode part 8 to cover a surface of anode body 6 in a band shape, so that contact between cathode part 8 and anode body 6 is restricted. Another part of the region of anode body 6 not facing cathode part 8 is electrically connected to anode terminal 4 by welding. Cathode terminal 5 is electrically connected to cathode part 8 via adhesive layer 14 formed of a conductive adhesive.

EXAMPLE

Hereinafter, the present invention is specifically described with reference to examples and comparative examples, but the present invention is not limited to the following examples.

«Solid Electrolytic Capacitors A1 to A3»

Solid electrolytic capacitor 1 (solid electrolytic capacitors A1 to A3) illustrated in FIG. 1 was produced in the following manner, and the characteristics of solid electrolytic capacitor 1 were evaluated.

(1) Preparation of Anode Body 6

Both surfaces of an aluminum foil (thickness: 100 μm) as a base material were roughened by etching to produce anode body 6.

(2) Formation of Dielectric Layer 7

A cathode formation part of anode body 6 was immersed in an anodizing solution, and a DC voltage of 70 V was applied for 20 minutes to form dielectric layer 7 containing aluminum oxide.

(3) Formation of Solid Electrolyte Layer 9

Separation part 13 was formed by attaching an insulating resist tape between the region where the solid electrolyte layer is formed and the region where the solid electrolyte layer is not formed of anode body 6 on which dielectric layer 7 is formed. Anode body 6 on which separation part 13 is formed was immersed in a liquid composition containing a conductive material, taken out, and dried to form a precoat layer (not shown).

A polymerization liquid containing pyrrole (monomer of a conjugated polymer), naphthalenesulfonic acid (dopant), and water was prepared. By adjusting the addition amount of naphthalenesulfonic acid, the pH of the polymerization liquid was adjusted as shown in Table 1. Using the obtained polymerization liquid, electrolytic polymerization was performed in a tripolar manner. More specifically, anode body 6 on which the precoat layer is formed, the counter electrode, and the reference electrode (silver/silver chloride reference electrode) were immersed in the polymerization liquid. A voltage was applied to anode body 6 in a manner that the potential of anode body 6 with respect to the reference electrode is the value of the polymerization voltage shown in Table 1 and electrolytic polymerization was performed at 25° C. to form solid electrolyte layer 9.

(4) Formation of Cathode Lead-Out Layer 10

Anode body 6 obtained in the above step (3) was immersed in a dispersion liquid in which graphite particles are dispersed in water, taken out from the dispersion liquid, and then dried to form carbon layer 11 at least on a surface of solid electrolyte layer 9. The drying was carried out at a 150° C. for 30 minutes.

Next, a silver paste containing silver particles and a binder resin (epoxy resin) was applied onto the surface of carbon layer 11, and heated at 150° C. for 30 minutes to cure the binder resin, thereby forming metal paste layer 12. Cathode lead-out layer 10 composed of carbon layer 11 and metal paste layer 12 was thus formed, and cathode part 8 composed of solid electrolyte layer 9 and cathode lead-out layer 10 was formed.

Capacitor element 2 was produced as described above.

(5) Assembly of Solid Electrolytic Capacitor

Cathode part 8 of capacitor element 2 obtained in the above step (4) was bonded to one end of cathode terminal 5 with adhesive layer 14 of a conductive adhesive. One end of anode body 6 protruding from capacitor element 2 and one end of anode terminal 4 were bonded to each other by laser welding.

Subsequently, resin exterior body 3 made of an insulating resin was formed around capacitor element 2 by molding. At this time, the other end of anode terminal 4 and the other end of cathode terminal 5 were drawn out from resin exterior body 3.

In this way, solid electrolytic capacitor 1 (A1 to A4) was completed. In the same manner as described above, 20 solid electrolytic capacitors were produced in total.

«Solid Electrolytic Capacitors A4 to A6»

After the formation of cathode lead-out layer 10, a heat treatment was performed at 230° C. for 5 hours. For each of solid electrolytic capacitors A4 to A6, 20 solid electrolytic capacitors in total were produced in the same manner as in the cases of solid electrolytic capacitors A1 to A3 except for the above description.

«Solid Electrolytic Capacitor B1»

In the formation of the solid electrolyte layer, electrolytic polymerization was performed in a bipolar manner. During the electrolytic polymerization, the anode body on which the precoat layer is formed and a Ti electrode as the counter electrode were immersed in the polymerization liquid, and a voltage was applied to the anode body in a manner that the potential of the anode body with respect to the silver/silver chloride reference electrode is the value of the polymerization voltage shown in Table 1. In addition, after the formation of the cathode lead-out layer, a heat treatment was performed at 230° C. for 5 hours. 20 solid electrolytic capacitors B1 were formed in total in the same manner as in the case of solid electrolytic capacitor A1 except for the above description.

[Evaluation]

The following evaluations were performed using the solid electrolytic capacitors or evaluation samples.

(a) Measurement of Oxygen Permeability

Under the same conditions as those for forming the solid electrolyte layer for each solid electrolytic capacitor, sample A for measuring an oxygen permeability was prepared by the procedure described above. With the use of sample A, the oxygen permeability of the solid electrolyte layer was measured by the procedure described above. Further, for the solid electrolytic capacitors A1 to A3, oxygen permeability $P_0$ was measured, because the solid electrolyte layers are not subjected to any heat treatment. For the other solid electrolytic capacitors, oxygen permeability $P_1$ was measured, because the capacitors are subjected to the heat treatment at 230° C. for 5 hours.

(b) Raman Spectrum Measurement of Solid Electrolyte Layer

The Raman spectrum of the cross section of the solid electrolyte layer (sample B) of the capacitor element taken out from the solid electrolytic capacitor was measured by the procedure described above. In the Raman spectrum of the solid electrolyte layer of the solid electrolytic capacitor B1, a peak (second peak) attributed to a C=C stretching vibration derived from polypyrrole was observed at 1582 cm$^{-1}$. In the Raman spectrum of the solid electrolyte layer of the capacitor element taken out from the solid electrolytic capacitor, the half width at full maximum of the first peak derived from polypyrrole was obtained, and the shift amount from the position (reference position) of the second peak was obtained.

(c) Electrostatic Capacity

The initial electrostatic capacity (μF) of each solid electrolytic capacitor at a frequency of 120 Hz was measured using an LCR meter for 4-terminal measurement under an environment of 20° C. Then, an average value of the 20 solid electrolytic capacitors was obtained.

Then, an accelerated test was performed by applying a rated voltage to the solid electrolytic capacitor for 2000 hours under an environment of 145° C. Thereafter, the electrostatic capacity after the accelerated test was measured in an environment at 20° C. using the same procedure as in the case of the initial electrostatic capacity and an average value of the 20 solid electrolytic capacitors was obtained. A value obtained by subtracting the initial electrostatic capacity from the electrostatic capacity after the accelerated test is defined as an electrostatic capacity change rate, and is expressed as a ratio when the initial electrostatic capacity is set to 100%. The electrostatic capacity change rate is a negative value, and a smaller electrostatic capacity change rate indicates lower heat resistance.

The results of the evaluation are shown in Table 1. A1 to A6 are examples, and B1 is a comparative example.

TABLE 1

| | Polymerization Voltage (V) | pH | Heat Treatment 230° C., 5 h | Oxygen Permeability (cm$^3$/m$^2$ · 24 h · atm) | Full Width at Half Maximum (cm$^{-1}$) | Shift Amount (%) | Electrostatic Capacity Change Rate (%) |
|---|---|---|---|---|---|---|---|
| A1 | 0.8 | 1.3 | — | $P_0$ = 0.603 | 53.1 | 0.80 | −1.60 |
| A2 | 0.7 | 1.7 | — | $P_0$ = 0.305 | 51.6 | 0.40 | −0.10 |
| A3 | 0.9 | 1.6 | — | $P_0$ = 0.638 | 54.2 | 0.40 | −1.30 |
| A4 | 0.8 | 1.3 | Yes | $P_1$ = 0.785 | 67.4 | 0.60 | −0.30 |
| A5 | 0.7 | 1.7 | Yes | $P_1$ = 0.349 | 58.4 | 0.30 | −7.50 |
| A6 | 0.9 | 1.6 | Yes | $P_1$ = 0.882 | 73.9 | 0.30 | −13.80 |
| B1 | 3.0 | 3.0 | Yes | $P_1$ = 1.302 | 83.5 | 0.00 | −40.20 |

As shown in Table 1, in the solid electrolytic capacitors A1 to A6, the oxygen permeability of the solid electrolyte layer is lower than that in the solid electrolytic capacitor B1, with a more suppressed decrease in electrostatic capacity. The oxygen permeabilities $P_1$ obtained when the solid electrolyte layers of the solid electrolytic capacitors A1 to A3 are heated at 230° C. for 5 hours are substantially the same respectively as the oxygen permeabilities $P_1$ in the solid electrolytic capacitors A4 to A6. Accordingly, in the solid electrolytic capacitors A1 to A6, the oxygen permeability can be considered kept low even after the heat treatment. In the solid electrolytic capacitors A1 to A6, the full width at half maximum of the first peak in the Raman spectrum of the solid electrolyte layer is smaller than that in the solid electrolytic capacitor B1. Further, in the solid electrolytic capacitors A1 to A6, the first peak is shifted from the reference position to the lower wavenumber side. Thus, in the solid electrolytic capacitors A1 to A6, the enhanced orientation of the conjugated polymer in the solid electrolyte layer is believed to improve the crystallinity or stabilizes the copolymerizable polymer in terms of energy, thereby improving the film quality of the solid electrolyte layer, and keeping oxygen permeability $P_0$ or $P_1$ low.

The present disclosure provides a solid electrolytic capacitor element and a solid electrolytic capacitor excellent in heat resistance. Thus, the solid electrolytic capacitor element and the solid electrolytic capacitor can be used for various applications in which high reliability is required.

The invention claimed is:

1. A solid electrolytic capacitor element comprising:
   an anode body;
   a dielectric layer disposed on a surface of the anode body; and
   a cathode part covering at least a part of the dielectric layer, wherein:
   the cathode part includes a solid electrolyte layer covering the at least the part of the dielectric layer,
   the solid electrolyte layer includes a conductive polymer component containing a conjugated polymer, and
   an oxygen permeability $P_1$ of the solid electrolyte layer after heating at 230° C. for 5 hours is less than or equal to 1.0 cm$^3$/m$^2$·24 h·atm.

2. The solid electrolytic capacitor element according to claim 1, wherein a difference ($P_1-P_0$) between the oxygen permeability $P_1$ and an oxygen permeability $P_0$ before the heating of the solid electrolyte layer is less than or equal to 0.3 cm$^3$/m$^2$·24 h·atm.

3. The solid electrolytic capacitor element according to claim 1, wherein the solid electrolytic capacitor element is subjected to a heat treatment at a temperature that is higher than 200° C. and lower than or equal to 300° C.

4. The solid electrolytic capacitor element according to claim 3, wherein the heat treatment is performed for 1 hour or more.

5. The solid electrolytic capacitor element according to claim 1, wherein the conjugated polymer includes a monomer unit corresponding to at least one selected from the group consisting of a pyrrole compound, a thiophene compound, and an aniline compound.

6. The solid electrolytic capacitor element according to claim 1, wherein a full width at half maximum of a first peak in a Raman spectrum of the solid electrolyte layer ranges from 35 cm$^{-1}$ to 80 cm$^{-1}$, inclusive, when the first peak attributed to a CC stretching vibration derived from the conjugated polymer is fitted with a Lorentz function.

7. The solid electrolytic capacitor element according to claim 6, wherein:
   a position of the first peak is shifted from a reference position to a lower wavenumber side by 0.2% to 1%, inclusive, and
   the reference position is a position of a second peak attributed to a C=C stretching vibration derived from the conjugated polymer when the second peak is fitted with the Lorentz function in a Raman spectrum of a solid electrolyte layer containing the conjugated polymer formed by bipolar electrolytic polymerization and heated at 230° C. for 5 hours.

8. The solid electrolytic capacitor element according to claim 1, wherein:
   a position of the first peak in a Raman spectrum of the solid electrolyte layer is shifted from a reference position to a lower wavenumber side by 0.2% to 1%, inclusive, when a first peak attributed to a C=C stretching vibration derived from the conjugated polymer is fitted with a Lorentz function, and
   the reference position is a position of a second peak attributed to a C=C stretching vibration derived from the conjugated polymer when the second peak is fitted with a Lorentz function in a Raman spectrum of a solid electrolyte layer containing the conjugated polymer formed by bipolar electrolytic polymerization and heated at 230° C. for 5 hours.

9. The solid electrolytic capacitor element according to claim 7, wherein:
   the conjugated polymer includes at least a monomer unit corresponding to pyrrole, and
   the reference position is 1582 cm$^{-1}$.

10. The solid electrolytic capacitor element according to claim 6, wherein:
    the conjugated polymer includes at least a monomer unit corresponding to pyrrole, and
    a position of the first peak ranges from 1566 cm$^{-1}$ to 1578 cm$^{-1}$, inclusive.

11. A solid electrolytic capacitor comprising the solid electrolytic capacitor element according to claim 1.

* * * * *